United States Patent Office 3,483,675
Patented Dec. 16, 1969

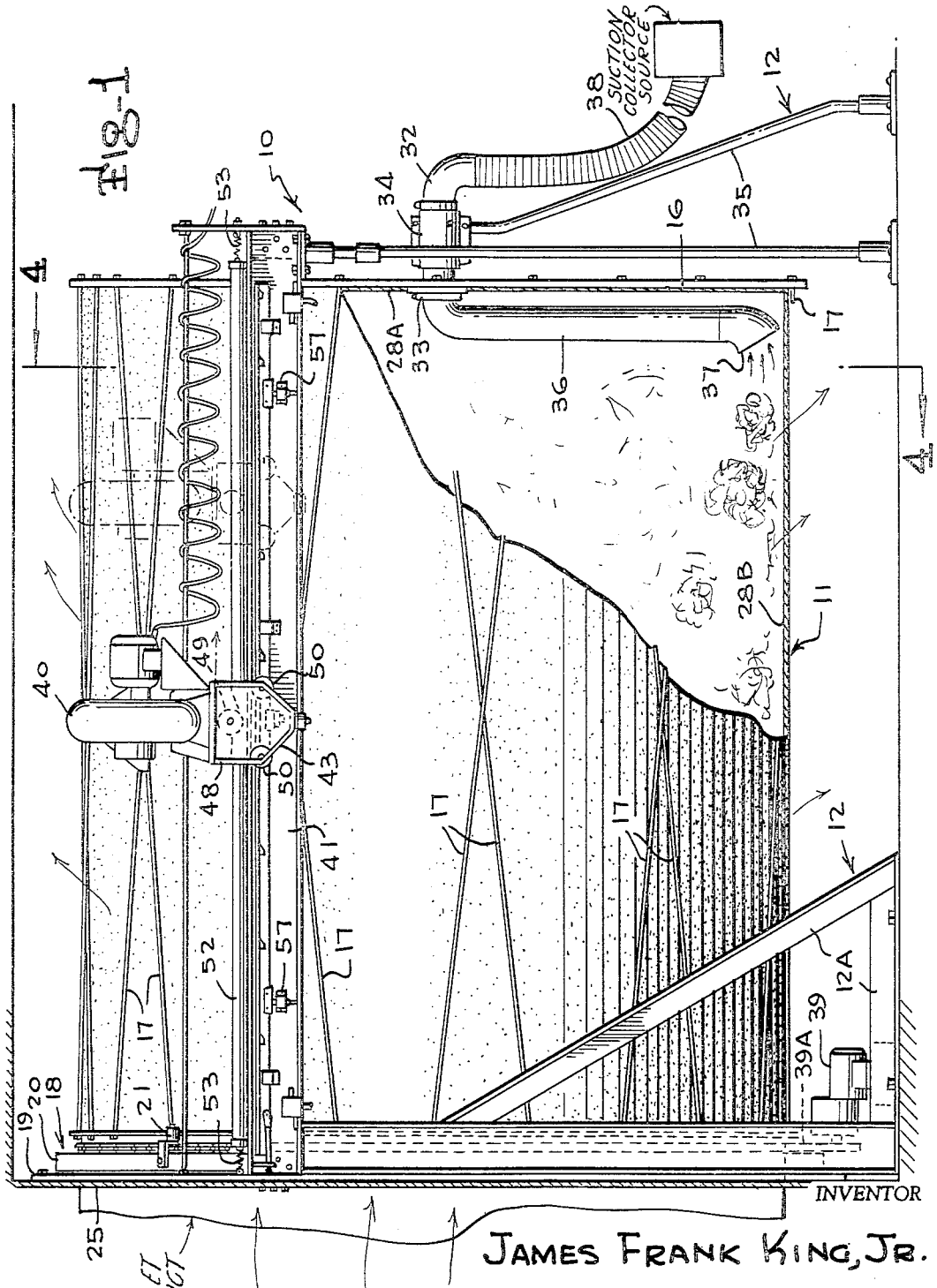

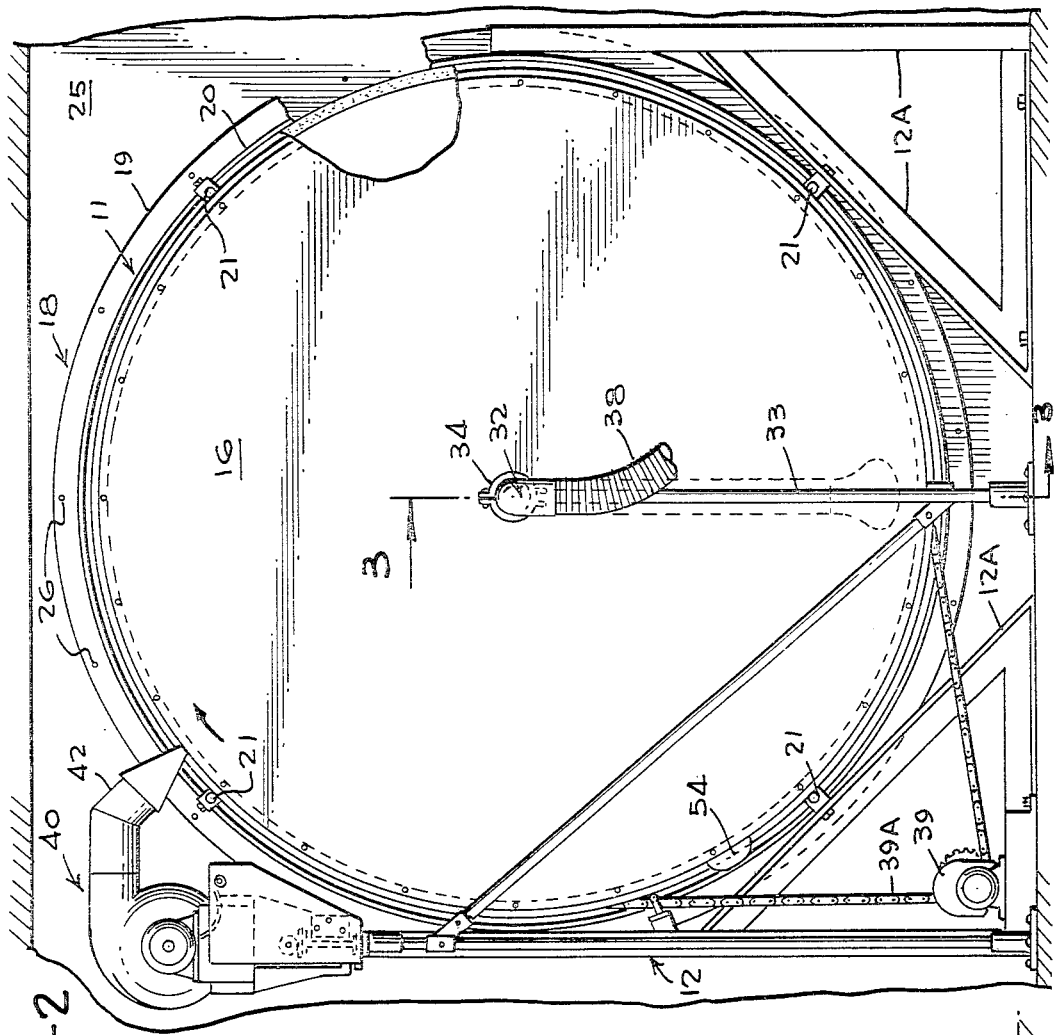

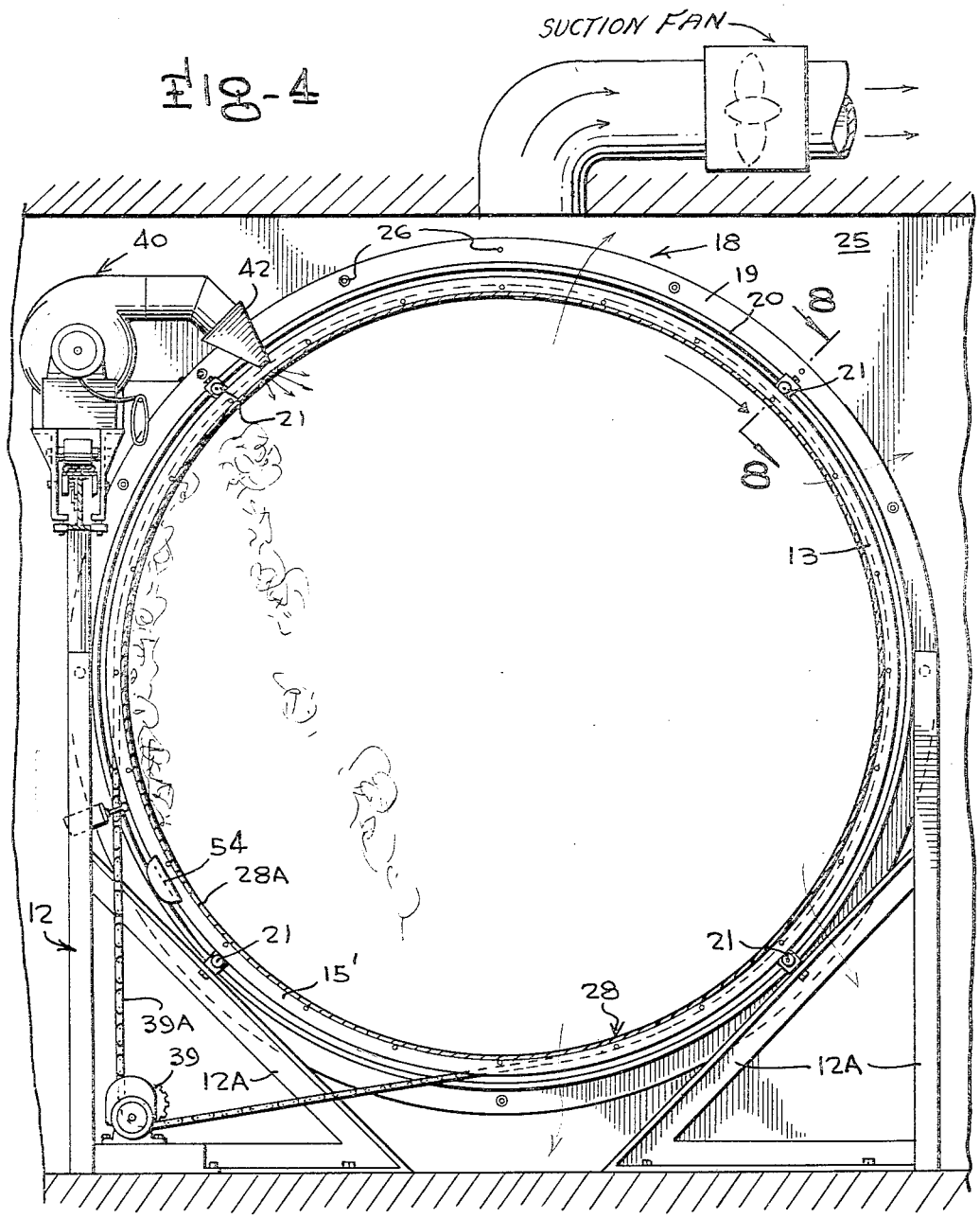

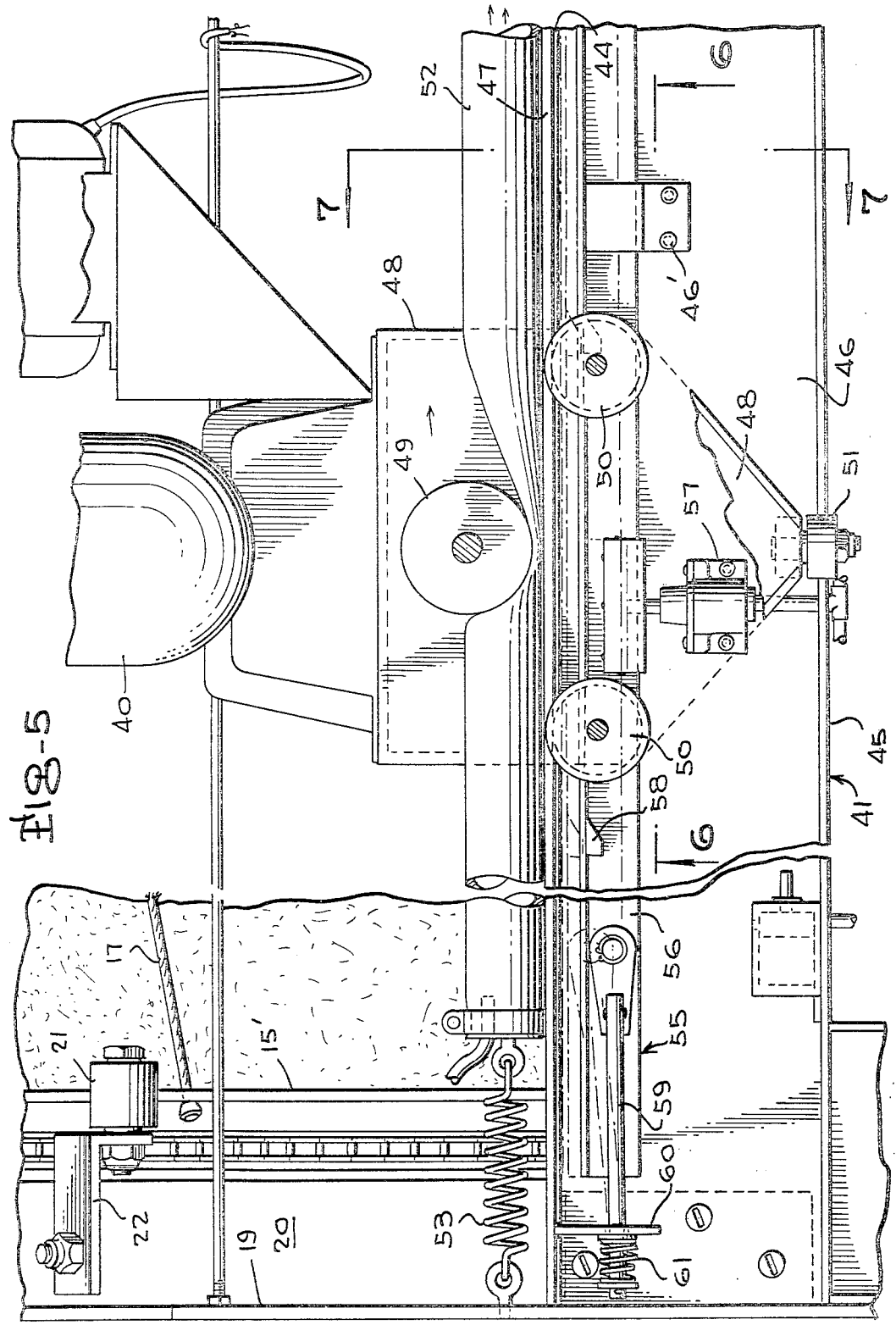

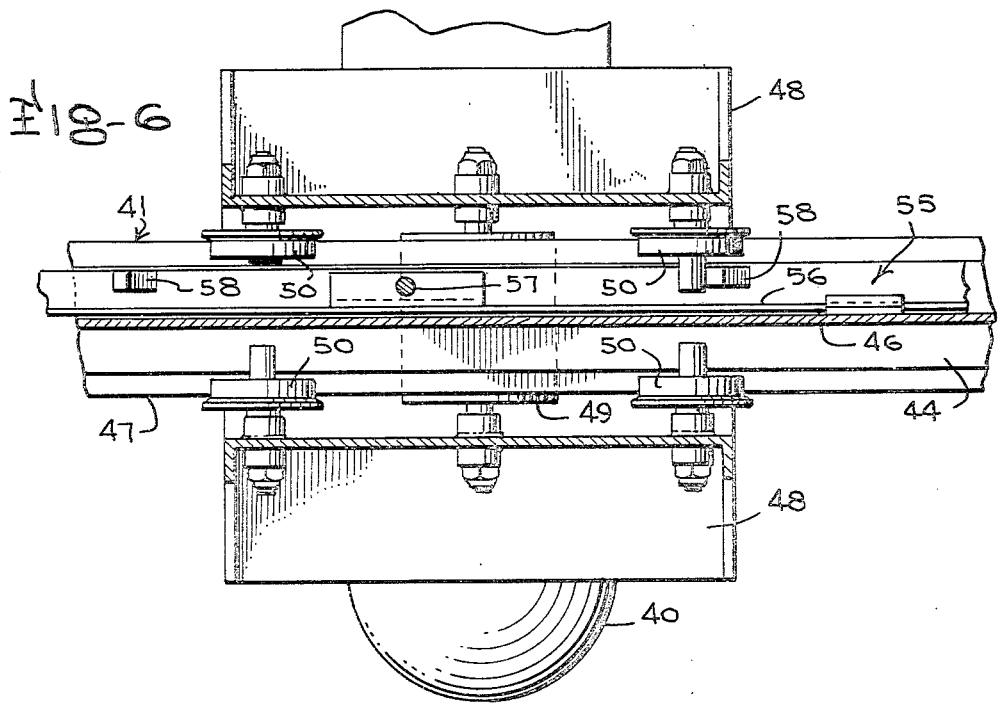
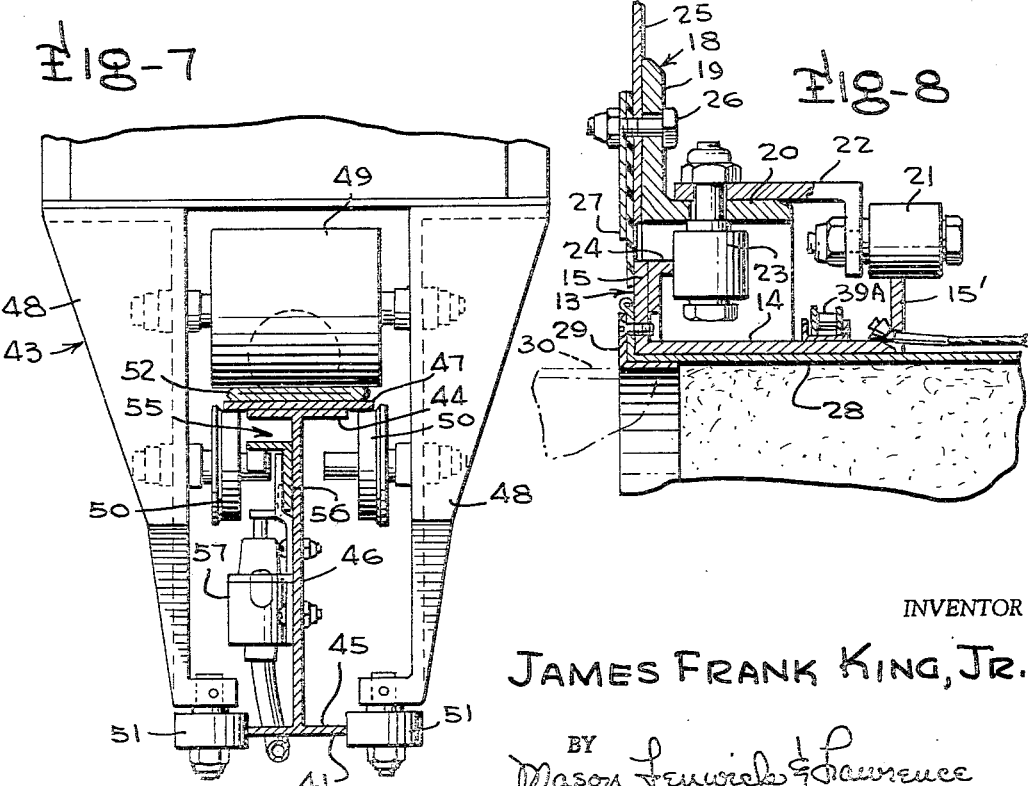

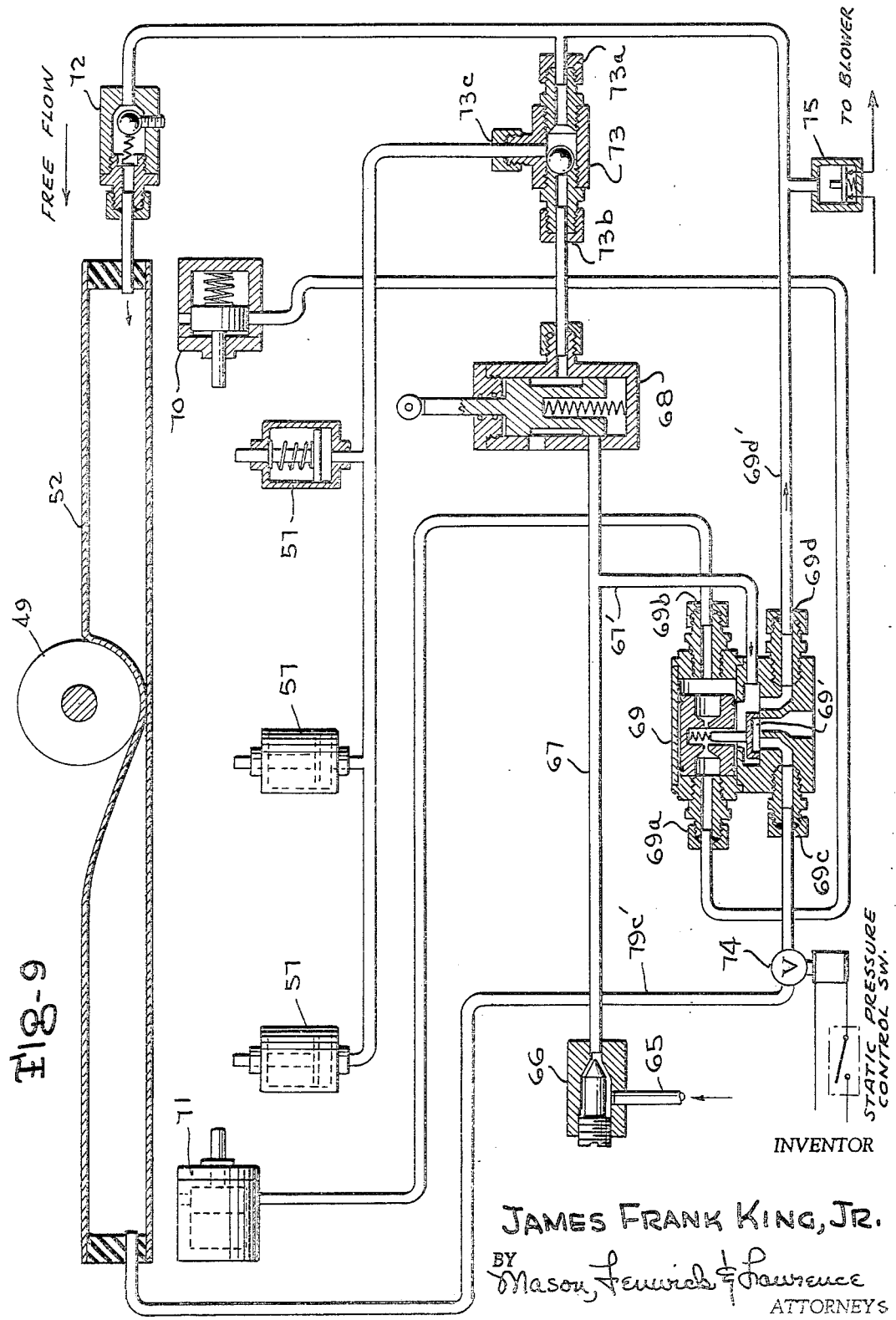

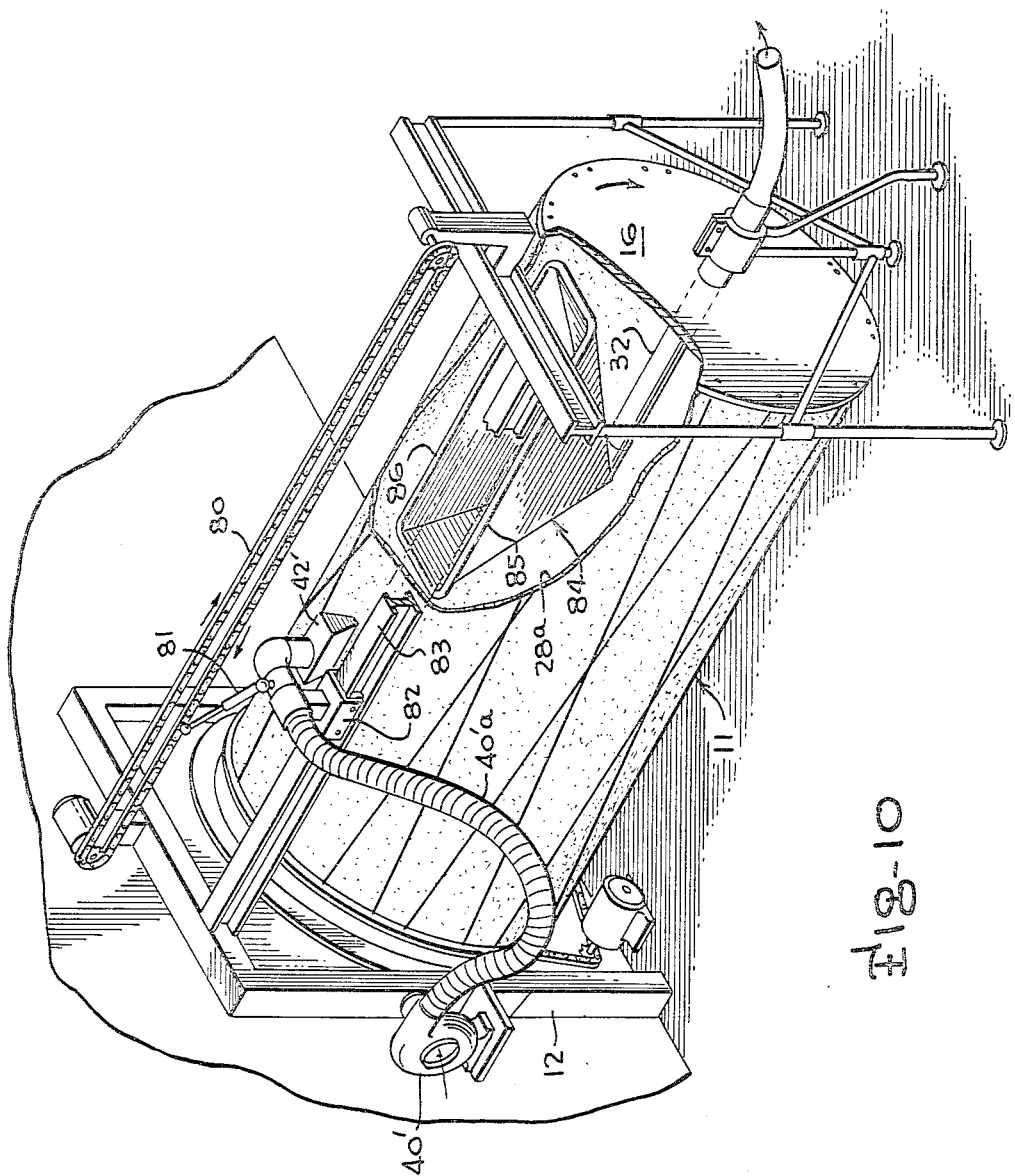

3,483,675
AUTOMATIC CLEANING FILTERING APPARATUS
James Frank King, Jr., Winston-Salem, N.C., assignor to The Bahnson Company, Winston-Salem, N.C., a corporation of North Carolina
Filed Jan. 12, 1967, Ser. No. 608,879
Int. Cl. B01d 46/04
U.S. Cl. 55—290                               10 Claims

ABSTRACT OF THE DISCLOSURE

A rotary cylindrical drum type filter for extracting contaminants from an air stream containing lint laden air, wherein the lint laden air enters an open end of the filter drum along air flow paths substantially paralleling the axis of rotation of the drum and is withdrawn from the drum interior through the drum wall along withdrawal air flow paths transverse to the axis of rotation to accumulate the contaminants on the interior surface of the drum wall. Means are provided to produce suction withdrawal of the contaminants from a selected location within the drum, and for periodically blowing high pressure air inwardly through the drum wall during rotation of the drum to dislodge the contaminant accumulations from the drum wall and blow them back along paths counter to the withdrawal air flow paths and to the suction location.

The present invention relates in general to filtering devices for extracting dust, lint, fibers and other fine particles from an air stream and the like, and more particularly to rotary drum type filters for central station filtering in air handling systems handling extremely large quantities of heavily lint-laden air, for example, in air conditioning systems or ventilating systems, or in central station filtering systems for processing lint-laden air collected from a plurality of spaced suction devices withdrawing lint-laden air from the region of a plurality of textile processing instrumentalities.

This invention has particular application to the removal of lint fibers from lint-laden air and will be described in connection with that particular application, although it will be understood that the invention will provide advantageous operating characteristics in many other applications.

It is common practice in textile processing plants to provide continous conditioning of the air in such plants so as to maintain such temperature and humidity conditions as will ensure that the textile fibers being processed are in the optimum condition for the processing being performed. Such textile air conditioning involves moving of large quantities of lint-laden air since it is an inescapable incident of high speed textile processing that lint fly is dislodged from the textile yarn or fabric and becomes entrained in the air streams moving about the building. Thus, lint screening becomes necessary to remove the fibers from the air to be conditioned, and thereby protect lint-vulnerable mechanical components downstream from the lint screen. Because of the high concentration of lint in textile room air the lint accummulation on the line screen occurs at a speed rate that requires periodic screen cleansing to prevent plugging of the air passages in the screen and result in faulty operation. Considerable effort has therefore been devoted to the provision of automatically cleaned screens which will effectively remove the lint from the air at sufficiently frequent intervals and in an appropriate manner to maintain the air in the textile processing spaces in appropriate condition. It will be apparent that it is impracticable in such textile air conditioning installations to continuously condition fresh supplies of exterior ambient air and deliver the same to the textile processing space, for example, a textile spinning room, at a sufficient rate to provide rapid changing of the air in the processing space, as excessively expensive temperature conditioning, air cleaning and humidifying apparatus would be required.

It has therefore become a common practice to provide facilities for conditioning and recirculating the air in the processing space, and to employ filter mechanisms for removing lint from the air being withdrawn from the processing space for conditioning and recirculation to remove the lint from the withdrawn air. In the main, such filter systems consisted of flat screens or rotary drums which are covered with some type of lint arresting media. To provide for proper operating characteristics over long periods of time notwithstanding the high rate of lint accumulation on such filter surfaces, they are customarily vacuum cleaned by an automatically traversed nozzle so that the entire filter surface is cleaned in a predictable length of time. In the case of the flat screen filter structures, a flat screen of large area appropriate to the volume of air to be handled was placed across the air stream to intercept the air-borne lint, and a wiping blade spanning the small dimension of the screen was scanned back and forth the length of the long dimension by a chain drive to dislodge the lint from the screen surface and effect its discharge to a collection point below the screen. Such flat screen type filter mechanisms had undesirable properties as the long span chain drive was subject to lint contamination and could not be effectively kept clean, the mechanical wiping of the screen disturbed the lint mass on the surface of the screen and allowed the dust which had been effectively filtered out of the air to then pass through the screen, and in practice, sagging of the central portion of the screen became unavoidable and rendered exceedingly difficult the attainment of relatively uniform effective wiping action over all parts of the screen area.

In the rotary drum type of filter mechanism heretofore used, a rotating, heavily reinforced, skeletonized drum was usually covered with a very permeable material such as one inch mesh hardware, over which was then placed the filter media which may be a cotton fabric or some specially prepared media for trapping the lint fibers. The details of the construction of such devices as customarily produced necessitated the lint being trapped on the outside of the rotating drum so that the static pressure drop through the filter media caused the media to draw in toward the drum center line and be reinforced by the hardward cloth. While this type of rotating drum filter mechanism has been found effective for separating out individual lint fibers which are carried by the air stream, it is limited in its application in that it is incapable of effectively handling coagulated masses of lint which may arrive at the filter, as such large accumulations of lint cannot be lifted from the floor level of the room in which the filter is situated to the surface level of the rotating drum which is mounted in some type of supporting frame-work on the floor. Further, where a traveling suction nozzle periodically traversing the surface of the drum type filter is employed to remove dirt, dust and lint accumulations from the surface, the inability to establish high velocity air flow directly through the filter media when suction nozzles are used so as to ensure effective cleaning of dirt and dust particles entrapped in the media therefrom and the complex air flows in the vicinity of such a rotating drum filter produce currents which have a tendency to blow large accumulated masses of cotton off of the filter surface before the suction stripping nozzle reaches them. Accordingly, such rotating drum type filters, although they have the advantage of permitting accumulation of the maximum filter surface area in the minimum space, are generally ineffective for filtering out and disposing of coagulated masses of accumulations of lint and do not permit attainment of the desired high efficiency in cleaning up the filter media.

An object of the present invention is the provision of a novel rotary drum type of air filter, for removing air-borne lint and coagulated masses and accumulations of lint fibers from an air stream, having means for automatically periodically cleaning the filter surface, and which avoids the aforementioned disadvantages of prior art filter apparatus.

Another object of the present invention is the provision of a novel rotary drum filter apparatus for removing lint from an air stream, wherein the filter material forms a closed end extension of a main air handling duct, and the lint is trapped on the inside of the rotating drum.

Another object of the present invention is the provision of a novel rotating drum type of filter for removing lint from an air stream, wherein a closed end rotating drum having filter media around the cylindrical surface thereof forms a closed end extension of a main air handling duct disposed so as to receive cotton and masses of lint which are propelled down the surfaces of the duct by the air stream and into the inside of the confines of the cylindrical filter, the lint being trapped on the inside of the rotating drum and the accumulations or masses of lint reaching the interior of the drum being withdrawn by a suction nozzle terminating within the drum adjacent the lower portion thereof at the closed end of the drum.

Another object of the present invention is the provision of a novel rotating drum filter mechanism arranged in relation to an air handling duct to receive the lint-laden air into the interior of the drum and trap the lint on the inside surface of the rotating drum, the filter media being disposed in the cylindrical path about the cylindrical surface of the drum, and wherein means are provided externally of the drum surface for directing a high velocity jet of air from the outside of the filter inwardly through the filter surface to dislodge the dust and dirt particles into the interior of the drum for collection and withdrawal by suction nozzle means.

Another object of the present invention is the provision of a novel rotating drum filter mechanism of the type described in the immediately preceding paragraph, wherein the means for directing the high velocity jet of air radially inwardly through the filter surface is scanned periodically from a first end of the drum through which lint-laden air is received to a second closed end of the drum is coordinated relation to rotation of the drum to progressively force the material dislodged from the filter media by the high velocity jet and any accumulated masses of lint within the drum toward the closed end thereof for collection by a suction withdrawal system.

Other objects, advantages and capabilities of the present invention will become apparent from the following detailed description, taken in conjunction with the accompanying drawings illustrating a preferred embodiment of the invention.

In the drawings:

FIGURE 1 is a side elevation view of the air filter apparatus of the present invention shown in installed condition in a building, a portion of the cylindrical wall of the filter drum being broken away to reveal details of the suction tube structure located in the interior of the drum;

FIGURE 2 is an end elevation view of the filter apparatus viewed from the right hand end of FIGURE 1;

FIGURE 3 is a fragmentary vertical longitudinal section view illustrating details of the mounting structure for the suction intake conduit and the closed end of the filter drum, taken along the lines 3—3 of FIGURE 2;

FIGURE 4 is a vertical transverse section view through the filter drum, taken along the line 4—4 of FIGURE 1;

FIGURE 5 is a fragmentary side elevation view, to enlarged scale, of the rail and trolley mcehanism supporting the blower mechanism for indexing movement along the exterior of the filter drum for periodically cleaning the filter media, parts being broken away to illustrate the internal structural details;

FIGURE 6 is a horizontal section view of details of the trolley mechanism, taken along the line 6—6 of FIGURE 5;

FIGURE 7 is a vertical transverse section view of the rail and trolley structure, taken along the line 7—7 of FIGURE 5;

FIGURE 8 is a fragmentary section view to enlarged scale of details of the mounting structure for the open end of the filter drum, taken along the line 8—8 of FIGURE 4;

FIGURE 9 is a schematic diagram of an exemplary pneumatic circuit for controlling driving and indexing movement of the travelling blower for cleaning the filter media; and, FIGURE 10 is a fragmentary perspective view of a modification of the air filter apparatus, with part of the filter medium wall broken away.

The filter apparatus of the present invention is designed especially for filtering out lint, dust and foreign particles from lint-laden air and for collectiton of coagulated masses and large accumulations of lint which may be propelled therewith to the filtering station, and may be generally described as comprising a rotating filter drum supported for rotation about a substantially horizontal axis and having a closed end and an open end. The drum is of a generally skeletonized construction, at least along the cylindrical wall portion thereof, within which is supported a filter media construction, for example, in the form of a large bag with a closed end at the closed end of the supporting drum and an open end which opens into, and thus effectively forms an extension of, a main air handling duct preferably of similar configuration and cross-sectional dimensions as the filter drum, through which the lint-laden air and cotton fibers are delivered to the filter mechanism. The filter apparatus is intended to be disposed in a room or enclosure defining an exterior surrounding space or zone about the drum to which suction is applied, as by a large suction fan or bank of suction fans, to establish pressure conditions which will draw the lint-laden air through the main air handling duct into the filter media bag in the filter drum and withdraw the air outwardly through the filter media walls into the exterior surrounding space while the lint, dust and foreign matter particles are retained within the filter media bag, the cleaned or filtered air being then processed in the usual manner, for example, by washing the same if desired and reconditioning the air, and then recirculating the same into the space being served by the system, such as the textile processing room. A traveling air blower is mounted adjacent the filter drum cylindrical wall externally of the filter media bag for reciprocative travel along a rectilinear path paralleling the axis of the drum, for example, on a suitable longitudinal rail located at a selective position alongside the drum. The blower discharges high velocity air through a nozzle adjacent the cylindrical wall of the filter media through the filter media toward the center line of the filter drum to dislodge lint which has accumulated on the inner surface of the cylindrical wall of the filter media bag and to dislodge the dust and dirt particles that have become entrapped in the filter media wall, to return them out of the bag wall toward the center line thereof along the original path they used to become trapped. The blower nozzle is preferably configured to discharge the high velocity air in a pattern which is relatively narrow circumferentially of the drum wall but which is of a substantial length axially of the drum wall, and the blower is successively stepped from one position to another from the open end to the closed end of the drum over incremental distances slightly less than the axial width of the blower discharge pattern, after remaining at each index or incremental position for one or a selected plurality of complete revolutions of the filter drum. A suction conduit forming the center bearing or journal structure for the closed end of the filter drum extends through the closed end and progresses downwardly to a point adjacent the nadir or lowermost point in the path of travel in the cylindrical drum wall near the closed end thereof to provide a suction intake opening or nozzle at that point through which the lint, dust, dirt and other filtered out particles and materials are withdrawn to a suitable external collection or disposal facility.

Referring now to the drawings illustrating a preferred embodiment of the present invention, like reference characters designating corresponding part throughout the several figures, the filter apparatus is indicated generally by the reference character 10 and comprises a large filter drum 11 of generally cylindrical configuration rotatably supported in a suitable framework indicated generally at 12 for rotation on a substantially horizontal axis. In one preferred example, the filter drum 11 is formed of a circular channel-shaped ring 13 having a cylindrical flange 14 and radial flanges 15 and 15' defining the inlet end of the filter drum, and a solid and rigid disc-shaped filter drum head 16 of an outside diameter corresponding substantially to that of a cylindrical flange 14 spaced an appropriate distance from the ring 13, the drum head 16 being connected adjacent its perimeter to the junction of flanges 14 and 15' of the ring 13 by a series of flexible steel cables 17 arranged in a criss-crossed manner similar to the arrangement of bicycle spokes so as to correlate rotation of the ring 13 and filter drum head 16. The circular ring 13 at the inlet end of the filter drum 11 is peripherally supported for rotation about the center axis thereof by a stationary circular angle iron frame 18 having a radial flange 19 and a cylindrical flange 20 by suitable rollers, for example, as illustrated in FIGURE 8. In the example there shown, a series of horizontal rollers 21 mounted on suitable brackets 22 extending from the cylindrical flange 20 bear against the outer edge of one of the radial flanges 15' of the channel-shaped ring 13 to constrain the ring 13 for rotation in concentric relation with its center axis, while a set of radial rollers 23 supported on radial axes of the drum from the cylindrical flange 20 of the circular frame 18 bear against sides of the radial flange 15 of the ring 13 or against a circular track member 24 secured to the radial flange 15, to restrain the ring 13 against displacement inwardly of its normal plane, or toward the right as viewed in FIGURE 8. The stationary circular frame 18 is supported in any suitable manner in a vertical partition or wall 25, as by the supporting feet 12A bolted to the floor and to the stationary ring 18, the partition 25 being for example, a sheet metal wall having an opening conforming substantially to the opening defined by the inner annular surface of the cylindrical flange 20, secured by bolts 26 to the flange 19, and forming one wall of the room or enclosure in which the filter apparatus 10 is located and to which suction is applied by suitable fans (not shown) in accordance with conventional practice to effect suction of air from the interior of the filter drum 11 outwardly to the surrounding space. A circular flexible sealing strip 27 or any other suitable facility may also be affixed to the wall 25 by the bolts 26 and project radially inwardly of the opening in the wall into lapping relation with a portion of the flange 15 of channel-shaped ring 13 to seal the space between the rings 18 and 13.

The filter media for the filter drum 11 is in the form of a large cylindrical bag 28 installed inside of the system of steel cables 17 and having a closed bottom end 28A disposed against the rigid drum head 16 and cylindrical sidewalls 28B lying immediately inwardly of the system of cables 17. The rim or lip of the bag 28 bounding the open end thereof is preferably removably attached to the rotatable channel ring 13, as by an angle-shaped circular retaining ring 29 which is secured by suitable fasteners extending through lip portions of the bag 28 to the flange 15 of ring 13 to clamp the lip portions of the bag to confronting portions of the ring 13. The open end of the filter media bag 28 may simply open into a horizontal channels or conduit of any desired configuration or size through which the lint-laden air is to be delivered to the filter apparatus, in installations where such an arrangement is appropriate, or the open end of the bag 28 may receive the exit end of an air handling duct of comparable cross-sectional size and configuration to the filter drum 11 so that the filter drum forms, in effect, a continuation or closed end extension of the air handling duct so that any cotton or foreign matter in conglomerate masses or accumulations may be rolled down the surface of the duct by the air stream and thereby be inevitably delivered into the inside of the filter bag 28. In such an arrangement, the exit end of the air handling duct or conduit may be associated with the open upstream end of the bag 28 in the manner illustrated in FIGURE 8 wherein the main air duct 30 projects slightly into the opening defined by the cylindrical flange of the retaining ring 29 and is of slightly smaller diameter than the retaining ring so that the filter drum assembly can rotate concentrically about the extended axis of the air handling duct 30.

The ring 13 at the upstream end of the filter drum 11 is supported for rotation in the stationary circular ring or frame 18 as previously described, while the circular filter drum head 16 at the downstream end of the filter drum and the bottom 28A of the filter bag 28 associated therewith are collectively journaled for rotation about the axis of the filter drum 11 and held a fixed distance from the upstream ring 13 by suitable rotating support assembly formed of a tubular conduit member 32, having a horizontal portion extending through a bearing 33 in the filter drum head 16 and held in a conduit mount 34 supported from the floor by appropriate framework such as the stanchion or posts 35. The tubular conduit 32 continues inwardly of the bag 28 along a downwardly directed course as indicated at 36 providing a vertical depending conduit section which terminates immediately adjacent the bottom of the bag 28 and near the filter drum head 16 in a forwardly or upstream opening suction stripping nozzle or intake 37, thereby forming a suction stripping pipe for withdrawing lint and foreign matter from the inside of the filter bag 28 by the suction currents created adjacent the intake or nozzle 37. The conduit 32 is connected by a suitable hose or pipe 38 to a conventional suction source, the pipe system 32, 36, 38 being for example, about three to four inches in diameter and having sufficient suction pressure applied thereto to convey away about 400–500 cubic feet of air per minute.

The filter drum 11, formed of the upstream ring 13, the head 16, and the system of cables 17, containing the filter media bag 28, is rotated about the horizontal axis defined by its supports, for example, by an electric motor 39 and a sprocket and roller-chain drive system 39A, wherein the roller-chain extends around the rotatable ring 13 in such a manner as to drive the same at a reasonably slow speed.

From the foregoing description, it will be understood that the filter drum 11 receives air laden with air-borne lint, dust and dirt particles through the inlet or upstream end of the filter drum defined by the ring 13, the lint-laden air being delivered to the filter apparatus by any desired duct arrangement, such for example, as the main air duct 30 of comparable cross-sectional dimensions and configuration as the internal diameter of the filter bag 28 terminating immediately inwardly of the upstream end of the filter drum 11. The air entering the interior of the filter bag 28 is drawn through the cylindrical sidewall 28B of the bag due to the suction pressures established in the zone outwardly surrounding the filter drum by the conventional suction fans (not shown) while the lint and foreign particles entrained with the air are separated therefrom by the filter media 28 and accummulate on the inside surface of the filter bag 28 or collect in the lowermost arcuate zone of the bag. The lint accumulations which collect in the lower arcuate zone of the bag together with the coagulated masses and large accumulations of lint which migrate down the main air duct 30 and into the filter bag 28 by the air currents progress to the end of the filter drum 11 adjacent the head 16 thereof, and are sucked into the suction tube 36 and withdrawn to the external collection facility connected to the hose 38. In such an arrangement, the pores or minute openings in the filter media bag 28 would soon become clogged by the lint, dust and dirt accumulations on the inside surface of the bag unless the lint accumulations are periodically removed. This is achieved in the present apparatus by a traveling bowler, indicated generally by the reference character 40, which is located externally of the cylindrical periphery of the filter drum 11 and is reciprocated along a rectilinear path from the upstream or inlet end of the filter drum to the downstream end adjacent the head 16 thereof, in coordinated relation with rotation of the drum to dislodge the lint, dust and dirt from the inner surface of the filter media bag 28 and move it to a location adjacent the inlet opening 37 of the suction pipe 36 so that these accumulations can be sucked away to the external collection facility. As illustrated particularly in FIGURES 1, 2 and 4, the blower 40 is installed on a track 41 at approximately the 10:00 o'clock position relative to the filter drum 11, as viewed in FIGURES 2 and 4, and comprises a high velocity scroll blower of conventional construction which will pick up clean air from the fan suction chamber externally surrounding the filter drum 11 and exhaust this air in a high velocity jet through a nozzle 42 which is directed through the filter media 28 toward the center line of the filter drum 11. This nozzle 42 is located to blow through the uppermost portion of the cylindrical wall 28A of the filter bag, and is shaped to establish an elongated air discharge pattern which spans a selected distance, for example, of about 12 inches, along a line parallel to the rotational axis of the filter drum and which is relatively narrow, for example, about one inch wide, along the direction of the circumference of the filter media. The exit end of the blower nozzle 42 is located a few inches away from the outside perimeter of the filter drum structure so that there will be no mechanical conflict between the two surfaces even though the filter drum may not be truly circular along its circumference. Since pressurized air can be carefully directed, this lack of proximity will present no problem.

Since the axial dimension of the filter drum 11 is many times the dimension of the blower nozzle 42 along the direction of the filter drum axis, the traveling blower 40 is caused to move in a series of successive increments or steps axially of the drum 11 from the inlet end to the closed end thereof, each step being of a length slightly less than the axial length of the blower discharge nozzle 42 in the direction of the axis of the filter drum, so as to provide a slight overlap of the adjacent edges of the air discharge pattern for successive incremental positions of the traveling blower. Thus, in an appropriate number of revolutions of the filter drum 11, the blower nozzle 42 can precisely cover the entire drum surface defined by the cylindrical wall 28A of the filter media bag, and then quickly return to the starting position adjacent the inlet or upstream end of the filter drum. Also, as the traveling blower 40 progresses from the upstream end to the closed end of the filter drum, the dislodged lint and other foreign matter is caused to progress to the closed end of the filter bag adjacent the filter drum head 16 and thereby be withdrawn through the suction inlet opening of the suction tube 36.

The traveling blower 40 is mounted on a wheel truck system or carriage 43 herein illustrated in greater detail in FIGURES 6 and 7, to roll freely on the track 41 from one end of the filter drum to the other, the track 41 being for example, a narrow flange I-beam having horizontal top and bottom flanges 44 and 45 and a vertical interconnecting web 46. Since the top flange may be slightly non-uniform, a flat plate of machined steel, indicated at 47, may be applied and fastened to the top flange 44 to flatten and widen its surface. The carriage 43 of the illustrated embodiment comprises a pair of sideplates 48 flanking the opposite sides of the track 41, in which a single load bearing roller 49 is journaled to ride on the top of the plate 47 and carry the weight of the carriage 43 and blower 40. The roller 49 is retained so that it can be lifted only a designed maximum distance away from the track by four flanged rollers 50 which run underneath the steel plate 47. Suitable stabilizing rollers 51 are mounted for rotation about vertical axis on depending lower portions of the side plates 48 to bear against opposite lateral edges of the bottom flange 45 of the rail 41. A flexible hose 52 is installed above the top plate 47 of the track between the plate 47 and the load bearing roller 49 and extends from end to end of the track 41 where it is stretched by a heavy spring 53 at each end thereof to retain the hose 52 in slightly tensioned condition. The proximity of the load-bearing roller 49 and lower flange rollers 50 is such that the flexible hose 52 underlying the load-bearing roller 49 is pressed closed and air tight under the load-bearing roller. When this hose 52 is pressurized from either of its two ends, the resulting forces on the load-bearing roller 49 will cause the entire truck assembly 43 with the blower thereon, to move away from the pressurized section of the hose 52 and toward the section from which air has been exhausted. By mechanically reversing valves at each end of the track system, the carriage 43 will be pneumatically propelled from one end of the track to the other and back again. By controlling the input volume of air, the carriage 43 can be moved slowly in one direction and quickly in the other.

Actuation of the traveling blower 40 to begin its traverse from the open upstream end of the filter drum to the closed end thereof may be effected in any desired manner, as by a timing device such as a mechanical timer or by a static pressure regulator which produces a signal when the filter drum has accumulated the maximum allowable lint load, to indicate that the cleaning should take place. Such a mechanical timer or static pressure regulator would activate the blower motor to cause the blower 40 to start blowing lint and dust away from the inner cylindrical surface of the filter media bag 28 toward the center line of the filter cylinder. The blower 40 should be operated only during the nozzle traverse from the open end of the filter drum toward the closed head end thereof. Upon completion of the revolution of the filter drum 11, the blower carriage 43 is activated through one step or increment slightly less than one nozzle length to advance to the next position down the filter surface toward the closed head end thereof, for example, by a cam 54 mounted on the rotatable ring 13 at the open end of the filter drum 11, which makes contact with the pneumatic valve once per revolution of the filter, as will be hereinafter described more specifically. In the disclosed embodiment the carriage 43 is stopped at its stepped or incremental positions by a mechanical stop assembly, indicated generally at 55, having an elongated angle iron rail 56 which may be lowered into operative position by pneumatic cylinder units 57 fixed on the web 46 of track 41 to lower the detents or depending stop formations 58 on the horizontal flange thereof into the path of the shaft of one of the lower flanged rollers 50 to mechanically stop the carriage at each desired location. Forward drive on the carriage will be maintained at all times even though the carriage may be periodically held by one of the detents 58. The rail 56 is preferably slidable longitudinally in brackets 46' fixed to the web 46 of the track 41, and is provided with a shock absorbing anchor at the upstream end thereof, for example, formed by the link or rod 59 pivotally connected to the rail 56 and extending in an upstream direction, therefrom through an anchoring plate 60 secured to the track 41, with a compression spring 61 surrounding the upstream end portion of the rod 59 and held between the washer on the upstream end of the rod and the anchor plate 60.

In response to activation by the cam 54 on the filter drum 11 signalling that a complete revolution of the filter drum has occurred, the cylinder units 57 are activated to momentarily elevate the rail 56 and the detents 58 carried thereby to allow the carriage 43 to progress toward the next position. Before the carriage can reach the next position, however, the detents 58 are reinstalled in the path of the shaft of one of the rollers 50 by appropriate operation of the cylinder units 57 to arrest the carriage at the next position for cleaning of the next incremental axial zone of the drum surface.

There is illustrated in FIGURE 9 an exemplary pneumatic circuit which may be used to provide the necessary drive for the traveling blower hereinbefore described, although it will be understood that the same functions could be accomplished electrically or by the use of hydraulic or pneumatic circuits together with electrical relays or through purely mechanical systems. Referring to FIGURE 9, the air supply enters through a supply conduit 65 through a conventional flow control valve 66, such as a hand-operated needle valve, and is supplied through conduit 67 to a cam operated three-way valve 68 and through branch 67' to a four-way control valve 69. The four-way valve 69 has a main air connection which enters a center chamber as well as two pilot valve connections and two branch line connections. The two pilot valve connections 69a and 69b are connected directly to a pair of pilot bleed valves 70 and 71 forming, in effect, limit position valves responsive to contact by the carriage to effect reversal of the system. The two pilot bleed valves 70 and 71 are really no more than dump valves which are normally closed but which completely exhaust the pilot line when the plunger of the valve is depressed.

The control valve 69 consists of a cylindrical spool in its uppermost part which is slidable within its chamber and has a very small orifice drilled completely through its center line communicating with a much larger transverse hole which is drilled most of the way through the spool. A spring-loaded slide valve 69' is located in this latter hole so that it will be moved by movement of the spool to be moved back and forth between the branch lines and the exhaust to bleed one branch line while supplying main air to the other or vice-versa. The hole in the spool which pilots this slide valve is considerably too large for the stem of the valve 69' so that air can leak past the slide valve stem through the small orifices and into the chamber on each end of the spool. These chambers communicate directly with their own pilot bleed valves previously described. Since the bleed valves 70 and 71 can handle appreciably more air than the small orifices drilled in the sliding spool, either of the two pilot lines can be reduced to virtually zero pressure by opening the appropriate bleed valve 70 or 71. When the pressure on one side of the spool is thus reduced, the spool has a tendency to slide away from the pressure side and toward the exhaust side. When both pilot bleed valves 70 and 71 are closed, the pressure quickly equalizes in both branch lines and in both chambers on each side of the spool and the spool has no tendency to move. This action causes the spool to have memory and to stay in the position to which it was last driven by operation of one or the other bleed valves 70, 71.

The branch air line to the branch line connections 69c of the control valve 69 extends to and communicates with one end of the flexible driving hose 52 and the other branch line connected to the branch line connection 69d extends to and communicates with the opposite end of the same driving hose 52. The branch line 69d', however, includes a flow control valve 72 therein which allows unrestricted air flow into its respective end of the flexible driving hose 52, but causes an adjustable restriction to occur when the air tends to flow out of the hose 52 because of a reversal of the control valve 69. Air flowing into one end of the hose 52 causes a like amount of air to flow out of the other end of the hose, which must be exhausted through the main control valve 69. The branch line 69d' also includes a pressure selector valve 73 in parallel with its circuit so that the pressure selector valve 73 experiences whatever pressure is being supplied to the right hand end of the air hose 52 as viewed in FIGURE 9.

The pressure selector valve 73 has two input connections 73a and b and a branch line connection 73c extending to the three air cylinders 57 connected in parallel and controlling the detent rail 56. The pressure selector valve 73 is then able to supply air from the branch line 69d' for from the cam operated valve 68 which is connected to the main air supply. It selects the higher of the two input connections and supplies air to its branch line 73c while closing off the lower pressure main connection. A normally closed solenoid valve 74 is provided in the branch line 79c' to close this line and maintain the carriage 43 parked at the upstream end of the track 41 when the static pressure control indicates that the filter media bag is clean, the solenoid valve 74 being under control of a conventional static pressure switch sensing the static pressure drop across the filter media. A pneumatic electric switch 75 communicates with the branch line 69d' to turn off the blower 40 during the return trip of the carriage 43 from the closed head end of the filter drum 11 to the open upstream end thereof.

The operation this pneumatic circuit to regulate the movement of the blower 40 is as follows:

Main air is supplied to both the four-way control valve 69 and the cam operated valve 68 through flow control valve 66 in the main air line 65 which establishes a maximum rate of air flow to the entire system. The two pilot bleed valves 70, 71 are located at each extreme end of the air hose 52 which furnishes the motive power for the blower cleaner 40. These bleed valves 70, 71 are so located that part of the mechanism of the blower 40 will contact one of these valves at each end of the proposed reversal point. If the framework of the traveling cleaning mechanism has just contacted the right-hand pilot bleed valve 70, the valve spool of the control valve 69 is shown in the proper location and main air is delivered through the flow control valve 72 and into the right-hand part of the flexible air hose 52 so that the cleaning mechanism is traveling toward the left-hand side of the page. The air flow is unrestricted in this case by the flow control valve 72 and the rate of return speed of the carriage mechanism 43 is controlled by the needle valve 66 in the main air line 65.

During this period the cam operated valve 68 which is shown in the depressed state will be shifted to the opposite end of its casing so that its line to the pressure selector valve 73 is open to exhaust and the pressure selector valve 73 will therefore be delivering main air from the branch line 79b' directly to the air cylinders 57 to activate them and lift the detents 58 completely out of play with the carriage 43 of the cleaning mechanism so that it can move all the way back to its left-hand unmolested.

Throughout the fast return trip of the cleaning carriage 43, the cleaning air flow is cut off by switch 75 so that air does not blow on the drum 11 and the entire return trip will be made very quickly. Since, however, the drum 11 will continue normal rotation during this period, the cam operated valve 68 which is operated by the cam 54 directly connected to the rotating drum 11 will be depressed momentarily every time the drum rotates through one revolution. This operation of the cam operated valve 68 simply doubles up on the main air supply to the air cylinders 57 and does not cause a change in the overall operation of the system.

When the cleaning carriage 43 arrives at the left hand end of the air hose 52, it contacts the pilot bleed valve 71, located at that position and exhausts the right hand chamber of the control valve 69 thereby moving the spool to the right hand side of the spool chamber. This operation connects the right hand end of the air hose 52 to the exhaust and directs main air into the branch line 79c' which extends to the air hose and the carriage 43 is moved away from the left hand hose end. At this time, pressure selector valve 68 has no main air pressure supplied to either of its two ports and its associated air cylinders 57 are deactivated. The detents 58 for the cleaning mechanism carriage 43 are therefor lowered in place and the carriage 43 will move approximately twelve inches and then be arrested by one of the detents 58. The detent mechanism is more than powerful enough to resist the forward thrust imparted to the carriage 43 by the air hose 52 and the entire traveling blower mechanism simply stops under pressure. This allows the drum 11 to rotate one full revolution or the majority thereof underneath the nozzle 42 of the blower so that a predetermined path around the cylindrical surface of the drum is cleaned each revolution. As soon as the revolution of cleaning is completed, the cam 54 of the filter drum 11 contacts the cam operated valve 68 and main air line pressure is momentarily routed through pressure selector valve 73 to the air cylinders 57 in parallel which then lift the detent mechanism free of the carriage 43 and allow it to continue its travel to the right. The cam operated valve 68 is held depressed by the rotating cylinder 11 only long enough to allow the carriage 43 to clear the arresting detent 58 against which it was resting, after which the cam operated valve 68 is again released and the detents are brought back into place so as to be ready to arrest the carriage 43 at the next incremental station.

When the blower mechanism is undergoing this controlled forward movement, the exhaust from the right hand side of the air hose 52 is controlled in volume by valve 72 so as to restrict the speed of travel of the mechanism to not only make the control in increments easier but also to reduce the impact loading on the detent mechanism that stops the carriage approximately every twelve inches.

It will be apparent that the herein described filter apparatus provides a particularly effective filter arrangement for filtering out lint, dust and foreign particles in a central station air handling system, wherein not only the airbore lint, dust and dirt are effectively removed from the air, but accumulated or coagulated masses of cotton are also effectively removed from the air conduit system. This, for example, would render the apparatus particularly suitable for central station filtering in applications where lint-laden air is collected by suction devices from the region of a plurality of a textile processing instrumentalities and large accumulations of lint ranging in size up to about, for example, the size of a basketball, may collect in the air-handling ducts leading to the central station and be propelled toward the filter installation by the moving air stream. As a particular example, the herein described filter apparatus may be effectively used in conjunction with suction systems for automatically removing waste from a plurality of cotton cards wherein suction nozzles are provided at appropriate positions at each card location to suck in lint-laden air and waste lint and convey the same through an array of interconnecting ducts to a central air-handling station where the filtering apparatus is located. Because of the arrangement of the filter drum and the filter media bag therein as an effective closed end extension of the main air handling duct, all cotton accumulations which develop in the air duct system ultimately and inevitably reach the inside of the filter drum 11 and migrate to the closed end thereof where they are withdrawn by the intake nozzle 37 of the suction tube 36.

The particular filter cleaning arrangement herein described also avoids the problems which are encountered in vacuum cleaned filter systems. One of the main problems associated with such a vacuum cleaned filter which utilizes a filter media capable of catching dust is the fact that vacuum cannot be directed and the only way to force air through the filter media to remove dirt and dust particles which are entrapped therein is to drag the nozzle across the physical surface of the media. Even then the air does not necessarily draw directly through the filter media, but comes from all sides within the media itself so that the velocity in the filter media is generally too low to remove all of the contaminants. However, the traveling blower of the herein described apparatus makes use of a pressurized stream of air which can be directed in almost any conceivable manner, and by directing the high velocity jet of air issuing from the nozzle 42 from outside of the filter drum wall toward the inside or dirty surface, the dust and dirt and lint entrapped thereon are effectively dislodged toward the interior of the drum 11 and as loose particles migrate to the suction intake 37 of suction pipe 36 where they are withdrawn to the exterior collecting facility.

If the filter media bag 28 has insufficient strength to withstand the stresses therein if reinforced only by the network of criss-crossed wires 27, a reinforcing mesh bag may be employed, made up of openwork material such as nylon fish net or the like, into which the filter media bag is inserted, the mesh bag thus supporting the filter media bag and being in turn supported by the cables 27.

As illustrated in FIGURE 10, the means for discharging high pressure air inwardly through the filter medium wall may be arranged to scan along a rectilinear reciprocative path paralleling and located in vertical alignment with the axis of rotation of the filter drum 11, rather than at the 10:00 o'clock position of the traveling blower 40 of the first described embodiment. In this modified form, the blower, here indicated by the reference character 40', has been secured to the stationary frame 12, and is coupled by a flexible hose 40'a to a nozzle 42' similar in configuration to the nozzle 42. The nozzle 42' is reciprocated axially of the filter drum 11 by a double flight chain drive 80 to which the nozzle 42' is coupled by a connecting rod 81 tied to one of the chain links to produce reciprocative movement even though the chain drive 80 rotates in one direction. The nozzle structure 42', of course, is guided in a rectilinear reciprocative path by any suitable means, such as a wheeled trolley 82 carrying the nozzle and running on a track 83.

Also, the suction conduit portions 36, 37 of the earlier embodiments are displaced by a suction hopper member 84 in the form of an upwardly opening trough which is of substantially V-shaped configuration in cross-section and side elevation, underlying approximately the downstream half of the path of travel of the nozzle 42', having its downwardly pointing apex on the centerline of the filter drum 11 and the upper edges of the sides 85, 86 of the hopper 84 disposed generally parallel to the drum centerline approaching the filter medium wall 28a, for example to within about 5 or 6 inches. The suction conduit 32 after passing inwardly through the filter drum head 16 then opens directly into the lower portion of the hopper 84 adjacent the head 16. Since the open top hopper 84 is disposed directly under the blowing nozzle 42' during approximately the downstream half of the travel thereof, the contaminants being blown off of the wall 28a beginning at approximately the axial midpoint along the drum are placed directly into the suction air stream in the hopper 84 for prompt removal from the drum 11. This tends to eliminate such heavy concentrations of lint in the downstream half of the drum as might otherwise occur during the blowing cycle which could reduce nozzle discharge air flow through the wall 28a to a level preventing the desired degree of filter medium cleaning, and also reduces any tendency of free floating contaminants within the drum which are dislodged by the nozzle air stream to return upstream and be redeposited on the previously cleaned filter surface.

While but two forms of the present invention have been particularly shown and described, it will be apparent that various modifications may be made within the spirit and scope of the invention.

What is claimed is:

1. Filtering apparatus for removing lint, dust and foreign particle contaminants from an air stream containing lint laden air, comprising a rotatable substantially cylindrical filter drum, means supporting said drum for rotation about a substantially horizontal axis of rotation, said filter drum having a first open end and a second end and a filter medium wall extending in a cylindrical path between said ends concentric with said axis of rotation, means for introducing the lint laden air through said first end into the interior of said filter drum along air flow paths substantially paralleling said axis of rotation and withdrawing the air from said filter drum through said wall along withdrawal air flow paths extending substantially transverse to said axis while concurrently stripping the contaminants from the air during air passage through said wall and accumulating the contaminants on the interior surface thereof, means establishing suction conditions at a selected suction collection zone within the interior of said filter drum spaced a selected distance axially from said first end and disposed closely adjacent the interior surface of said wall for suction withdrawal of the contaminants in said zone to an exterior location, means for rotating the filter drum; and means for cleaning accumulated contaminants from said interior surface and transferring them to said zone including a traveling blower located outwardly of said wall having a discharge nozzle for directing a jet of high pressure air radially inwardly through the wall in a discharge pattern spanning a selected axially elongated segment of the wall, means for reciprocatively moving the blower in a path through a cleaning stroke from said first end to said second end and through a return stroke to said first end, the blower during said cleaning stroke traversing the axial length of said wall in coordinated relation to the rate of rotation of the drum to cause discharge air from said nozzle to intercept all parts of said wall, and blower control means activating said blower to discharge air through said nozzle throughout said cleaning stroke to cause the discharged air to progressively urge contaminants dislodged from said wall toward said suction collection zone and disabling said blower from discharging air during said return stroke.

2. Filter apparatus as defined in claim 1, wherein the path of travel of said blower is arranged in parallelism with said horizontal axis, and said nozzle is located in substantial vertical alignment with the axis of the drum for movement along said path to effect gravitationally aided contaminant travel from the filter medium wall to said suction collection zone responsive to said high pressure air discharged from said nozzle.

3. Filtering apparatus as defined in claim 1, wherein said second end of said filter drum is a closed end and comprises a rigid circular head member, said means establishing said suction conditions comprising a suction pipe supported at a fixed station having a horizontal portion extending through the center of said head member forming journal means rotatably supporting said head member for rotation about said horizontal axis, and said suction pipe having a downwardly extending portion lying within said drum immediately adjacent said head member projecting to a location adjacent said lowermost portion of said cylindrical path and terminating in said intake opening.

4. Filtering apparatus as defined in claim 1, wherein said means for moving said blower through said cleaning stroke includes means for advancing the blower in steps not greater than the axial length of said discharge pattern and interrupting travel of the blower at successive stepping stations along its path of travel for the period of at least one revolution of the filter drum while discharge of air from the blower nozzle is continued to clean the whole circumferential band of the filter medium wall spanned axially of the nozzle at each of said stations.

5. Filter apparatus as defined in claim 1, including a trolley for said blower, track means located externally of said drum supporting said trolley and blower for rectilinear reciprocative movement in said path paralleling said horizontal axis through said cleaning and return strokes, and said trolley having roller means bearing against said track means to movably support said blower in a selected attitude throughout the travel thereof along said path.

6. Filtering apparatus as defined in claim 1, wherein said air stream containing lint-laden air passes through a substantially horizontal conduit to said filter drum, said conduit having a downstream outlet end portion of substantially circular cross-section, and said cylindrical filter medium wall having a cross-section conforming substantially to the cross-section of said conduit outlet end portion and being disposed with said open end of the drum adjacent the outlet end of said conduit in axially aligned relation thereto to form a rotatable extension of the conduit for reception of coagulated masses and accumulations of lint moved through the conduit by the air stream passing therethrough.

7. Filter apparatus as defined in claim 1, wherein said open end of the filter drum comprises a ring defining the upstream end of said filter medium wall, roller means bearing on the radially outer surface portions of said ring rotatably supporting the same for rotation about said horizontal axis in concentric relation thereto, and said second end of said filter drum including a cylindrical portion coupled to said ring for coordinate rotation therewith.

8. Filtering apparatus as defined in claim 3, wherein said open end of the filter drum comprises a ring defining the upstream end of said filter medium wall, roller means bearing on the radially outer surface portions of said ring rotatably supporting the same for rotation about said horizontal axis in concentric relation thereto, and said circular head member being coupled to said ring for coordinate rotation therewith.

9. Filter apparatus as defined in claim 5, wherein said blower control means comprises an elongated collapsible pneumatic hose spanning the length of said track means and disposed against an upwardly facing track surface thereof, said trolley having a roller bearing upon said hose and compressing the hose to substantially flat condition against said track surface, and compressed air control means coupled to opposite ends of said hose and having valve means for directing compressed air to selected ends of said hose to exert pneumatic forces on said roller driving said trolley and blower through said cleaning and return strokes.

10. Filter apparatus as defined in claim 5, wherein said blower control means comprises detent means including detents and pneumatic cylinder means movably supporting the same normally disposing the detent in the path of said trolley to engage a portion of the trolley and arrest travel thereof at successive stepping stations along the path of travel of said trolley, cam actuating valve means for controlling application of compressed air to said cylinder means, and cam means on said drum for activating said cam actuated valve means once each revolution of said drum to momentarily activate said cylinder means to disengage said detents from said trolley and release the trolley for travel to the next stepping station.

References Cited

UNITED STATES PATENTS

| | | | |
|---|---|---|---|
| 1,878,998 | 9/1932 | Akins | 210—107 |
| 2,315,278 | 3/1943 | Shaw | 55—290 |
| 3,000,507 | 5/1961 | Young | 55—302 |
| 3,000,663 | 10/1962 | Morris et al. | 55—302 |
| 3,166,391 | 1/1965 | Keser | 55—302 |
| 3,304,571 | 2/1967 | Black | 15—352 |
| 3,339,348 | 9/1967 | Bratton et al. | 55—294 |
| 3,315,446 | 4/1967 | King | 55—294 |
| 3,345,805 | 10/1967 | Sherrill | 55/294 |

FOREIGN PATENTS

| | | |
|---|---|---|
| 687,742 | 5/1930 | France. |
| 925,874 | 5/1963 | Great Britain. |
| 1,010,337 | 11/1965 | Great Britain. |

HARRY B. THORNTON, Primary Examiner

B. NOZICK, Assistant Examiner

U.S. Cl. X.R.

55—294, 467, 302, 378, 430; 210—394; 15—352